United States Patent [19]
Cox

[11] 4,094,518
[45] June 13, 1978

[54] SHAFT SEAL

[75] Inventor: Jack Jebson Cox, Cheltenham, Australia

[73] Assignee: Flavell Proprietary Limited, Australia

[21] Appl. No.: 717,008

[22] Filed: Aug. 23, 1976

[30] Foreign Application Priority Data

Aug. 27, 1975 Australia .............................. 2956/75
May 4, 1976 Australia .............................. 5800/76

[51] Int. Cl.² ............................................. F16J 15/34
[52] U.S. Cl. .................................................... 277/95
[58] Field of Search ........................ 277/95, 133, 134

[56] References Cited

U.S. PATENT DOCUMENTS

| 2,144,691 | 1/1939 | Schmal | 277/95 |
| 2,192,305 | 3/1940 | Gilman | 277/39 |
| 3,511,511 | 5/1970 | Voitik | 277/95 |
| 3,523,692 | 8/1970 | Otto | 277/134 |
| 3,561,770 | 2/1971 | Corsi | 277/39 |
| 3,807,743 | 4/1974 | Burke | 277/134 |
| 3,868,105 | 2/1975 | Bentley | 277/134 |
| 3,945,708 | 7/1960 | Stephens | 277/82 |

Primary Examiner—Robert I. Smith
Attorney, Agent, or Firm—James T. FitzGibbon

[57] ABSTRACT

A seal for sealing between a shaft and a shell where the shell is sealingly located between two webs which extend radially outwardly from a body portion, and inwardly towards each other.

7 Claims, 4 Drawing Figures

SHAFT SEAL

This invention relates to improved seals and relates particularly, but not exclusively, to an improved shaft seal.

Hitherto, in constructions where seals must seal between a shaft and an object and where there is relative rotational movement between the shaft and the object, seals of the lip type have been omitted as the frictional resistance imposed on the shaft and the object thereby is too great to allow for the required rotational movement.

Further to this, in such constructions, for example, free turning roller conveyors, it has been general practise to provide a shell which is fitted to the roller and which surrounds the shaft. The dust seal is arranged to be fitted to the shaft and rotatably engage with the shell to provide the necessary seal. Such a combination, however, is satisfactory for only a short period as the seal works along the shaft and/or becomes inclined to the shaft axis and as a result becomes ineffective.

Ten years ago, the standard method of manufacturing a synthetic rubber oil seal was to mold the basic shape of the element, and then knife trim the lip. This produced a seal in which the lip contacted the shaft in a plane at right angles to the axis of the shaft.

This type of seal ran on a film of oil, which could be considered to be approximately 0.0001 inch thick. The surface tension of the oil at the oil to air interface produced a meniscus and provided the sealing force. It can be understood that this force was quite small, and that it took very little change in radial lip force to allow the film to become too thick, and oil to leak.

It was about this time that oil seal manufacturers started to investigate the use of various means of applying hydrodynamic axial sealing forces to increase the efficiency of the seal.

The first forms of these seals had helical raisures or depressions on the air side of the sealing lip. This produced contact patterns on the shaft in which angular barbs would deflect oil back to the oil side of the seal should the seal commence to leak. This type of seal could only be used where the shaft always rotated in one direction, and where this direction was known. They were called monodirectional, hydrodynamic seals.

Several types of bidirectional, hydrodynamic seals were developed, again using patterns on the air side of the lip. In general, the patterns produced pockets with sides angles in such a manner that should oil enter the pocket, it would be wiped back by one of the angular sides.

All these types of seal were subject to three major problems:

1. It was difficult to manufacture the moulds because of the intricate shapes, and therefore they were costly;
2. It was difficult to produce these shapes consistently because the moulds became dirty and in some cases, the rubber did not flow into crevices. This produced a quality control problem, and
3. In operation, particles of dust or other foreign bodies tended to collect in the crevices and often reversed the effective angle. This caused the seal to leak.

Also, the conventional type of seal with a trim lip surface has a narrow band of contact in a plane at right angles to the axis of the shaft. The fact that this band is narrow means that there is not a great heat transfer area, and underlip temperatures can be much higher than that of the surrounding oil. This causes reduction in seal life.

One of the problems with the radial lip type seal is that the seal manufacturer does not have control of the sealing surface against which the seal rubs and is therefore to a great extent in the hands of the shaft manufacturer. Seals are also often fitted on worn shafts which are unsatisfactory for sealing purposes.

After 500 hours of running under clean conditions, the lip of a seal of the above type would only have lightly polished a shaft, but if the seal had run with abrasive dust at the lip it would have cut a deep groove in the shaft, and the seal would commence leaking at a very early stage. This indicates the importance of dust exclusion in relation to oil sealing.

In order to compare the effectiveness of various forms of dust excluders there is used a standard oil bench test rig having an impeller at the end of the shaft in such a way that when the shaft rotated, blades would pick up the media nd impel it towards the outer face of the seal.

The media used is a mixture of 20 parts by volume of cement dust not larger than 105 microns, and 100 parts of builder's sand, not larger than 1400 microns and not smaller than 300 microns. The sand ran freely and kept the cement dust moving.

The standard test used a shaft speed of 1200 r.p.m., the sealing devices having to seal an EP 90 oil at 90° F. The shaft has a surface furnish of 8 - 20 CLA and a runout of 0.007 inch T.I.R. A cycle of 45 minutes on and 15 minutes off was maintained for 20 hours each day. The shaft was stationary during the remaining 4 hours and the heaters switched off.

The test was found to be extremely severe, and the characteristics of the various known dust excluders were easily established.

CLEARANCE TYPE SYNTHETIC RUBBER WIPER LIP

A wiper lip with negligible contact on the shaft, of the sort designed to give protection from normal dust conditions and yet not cause heat build up on the shaft, with subsequent shortening of seal life, was found to have cement dust between the lips after only 20 hours of testing.

FLAT LEATHER WIPER LIP

A seal having a flat leather type of dust excluder was then tested. After a test of 20 hours, there was no sign of failure, but after a test of 68 hours, the dust had started to penetrate the wiper lip, and after 500 hours it had caked the inside of the seal.

FELT WIPER LIP

A seal with a felt wiper lip was tested and after 20 hours, dust had started to work its way across the felt, but there was none inside the seal. After 500 hours, the dust had penetrated between the lips, and had formed little balls of cement.

NON-FLEXIBLE CONTACT TYPE OF SYNTHETIC RUBBER WIPER LIP

A seal with a non-flexible type of rubber contact lip was next tested. These lips usually wear to shaft size within the first few hours. After 16 hours, dust had penetrated the lip.

FLEXIBLE CONTACT TYPE OF SYNTHETIC RUBBER WIPER LIP

A seal with a flexible type of wiper lip, having 0.030 inch interference was next tested. After 16 hours, no dust had penetrated the lip. After 500 hours, dust was packed between the lips.

WIPER LIP TORQUE

Typical torque figures for wiper lips, based on a 1½ inches shaft diameter and in lb/inches, are:
Leather; 1¾ - 4½
Felt: 1 - 2½
Non-Flexible synthetic wiper: 1¼ - 1½
Flexible wiper: ¼ - ½

In order to appreciate the amount of heat generated by these torques, we converted the half-inch/lb torque of the flexible wiper lip on a shaft rotating at 3000 r.p.m. into watts. A result of 17.8 watts was obtained. It can therefore be taken that roughly 50 flexible wiper lips would generate as much heat as a 1 kilowatt element, which is quite a substantial amount.

It is therefore an object of the present invention to provide an improved seal which has a substantially reliable friction free engagement between a shaft and an object where there is relative rotational movement between the shaft and the object.

It is also an object of the present invention to provide such a seal which will have considerably long working life.

With the above and other objects in mind the present invention provides a shaft seal adapted to be fitted about a shaft and held substantially stationary thereabout, said seal having radially outwardly extending webs extending therefrom adapted to embrace therebetween an object to form a seal between the shaft and the object.

In order that the present invention can be more clearly ascertained and readily put into practical effect, the preferred embodiments of the invention will now be described by way of example only and with reference to the accompanying drawings. In the drawings.

Figure 1:
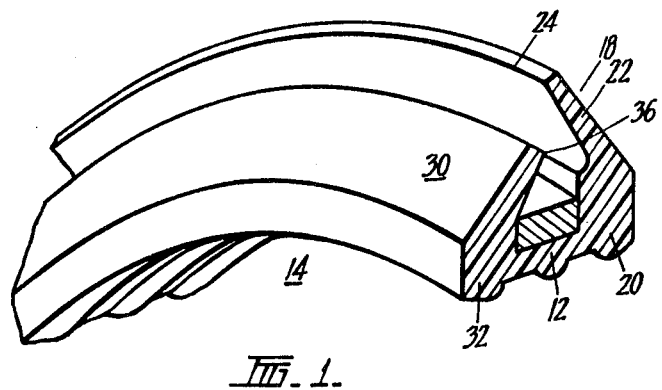
FIG. 1 is a perspective view of a section of a first embodiment.
Figure 2:
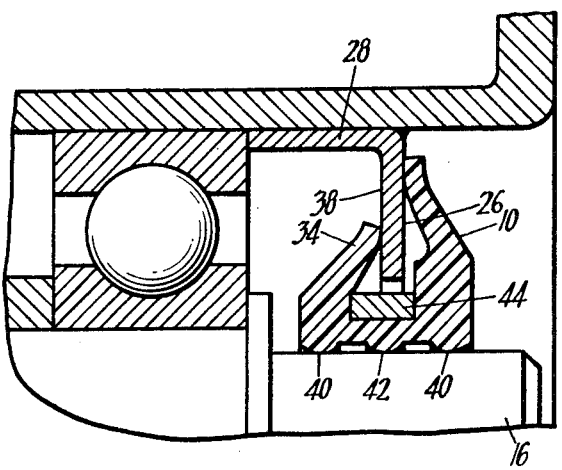
FIG. 2 is a vertical cross-sectional view showing the seal of FIG. 1 in use.

The seal comprises a cylindrical base portion 12 with a concentric bore 14 therethrough of a size which will firmly engage a shaft 16. Two radially outwardly extending webs are provided and are positioned with one at each end of the base portion 12.

The web 18 at the outermost end 20 of the base portion 12 (hereinafter referred to as the "outer sealing web") is inclined inwardly of the seal at an angle of approximately 30° to the transverse plane of the seal 10.

The outer sealing web 18 is of reducing thickness at the greater radial distances so as to provide for a slight taper effect in cross-section. The radially outermost end 22 of the outer sealing web 18 terminates to provide a sharp inner edge 24 adapted to engage with the outer face 26 of a rotating shell 28.

The web 30 on the innermost side 32 of the seal 10 (hereinafter referred to as the "inner sealing web") also extends inwardly of the seal 10, and is inclined at an angle as of 25° to the transverse plane of the seal. The inner sealing web 30 is also of slightly tapering cross-section from the base 12 to the radially outermost end 34 and may be of greater thickness than the outer sealing web 18. The outer end 34 of the inner sealing web 30 also terminates to provide a sharp inner edge 36 adapted to engage with the inner face 38 of the rotating shell.

The bore 14 of the base portion 12 is provided with two radially-inwardly-projecting spaced-apart ribs 40 which act to assist the complete and efficient sealing between the seal 10 and the shaft 16 and which are located at the ends 32 and 20 of base portion 12. A further identical rib 42 is provided centrally of the base portion 12.

Located around the base portion 12 between the webs 18, 30 is a ring 44 which is adapted to provide a radially inwardly directed force onto the base portion 12 and hence to increasing the sealing effect between the seal 10 and the shaft 16 as well as reducing the tendency for the seal 10 to creep along the shaft 16. The ring 44 would also tend to stop radial deformation of the seal 10 at high rotational speeds. The ring 44 acts to compress the rib 42 onto the shaft 16 so as to increase the sealing effect between the seal 10 and the shaft 16. In doing this, a couple is created which tends to face the outer web 18 onto surface 26 and inner web 30 onto surface 38, and thus increases the sealing effect between the seal 10 and the shell 28.

In operation, the seal 10 is fitted to the shaft 16 and the shell 28 located between the webs 18, 30. The locating of the shell 28 between the webs 18, 30 also reduces the tendency for the seal 10 to creep along the shaft 16 due to the inherent self-centering action.

The free distance between the radially outermost portions of the inner 18 and outer 30 webs is less than the thickness of shell 28 so that the sharp inner edges on those webs will lightly engage the shell and thereby will provide an effective seal therebetween which is almost friction free because of the sharp edge contact therewith. The inner web provides a seal for preventing grease oil and the like from escaping from behind the seal and the outer web provides a seal for preventing the ingress of dirt and the like into the bearing behind the seal.

The shell 28 may be arranged to rotate about the stationary shaft 16 between the webs 18, 30 of the seal 10, or the shaft 16 may be arrranged to rotate within the shell 28.

The seal 10 of this construction has superior sealing characteristics than known seals and also has less friction associated therewith. Using the test described above, a seal according to the invention was run satisfactorily for 168 hours thereupon the sand and cement dust box was fitted. After 500 hours of running oil has not leaked from the seal nor had cement dust or sand passed the seal. The seal does not require exactness in shaft diameter as it has been found that, for example, a 3 fifteen-sixteenths inch seal will operate satisfactorily on shafts within 0.002 inch of the nominal shaft size.

Figure 3:
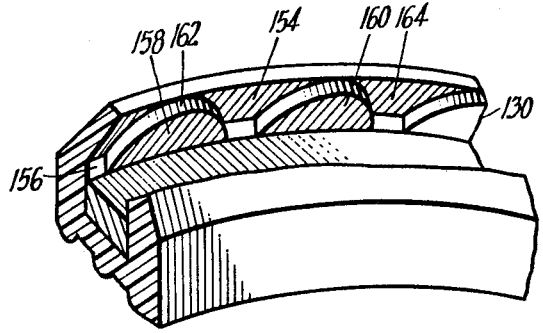
FIG. 3 is a vertical cross-sectional view of a second embodiment of the seal in use.
Figure 4:
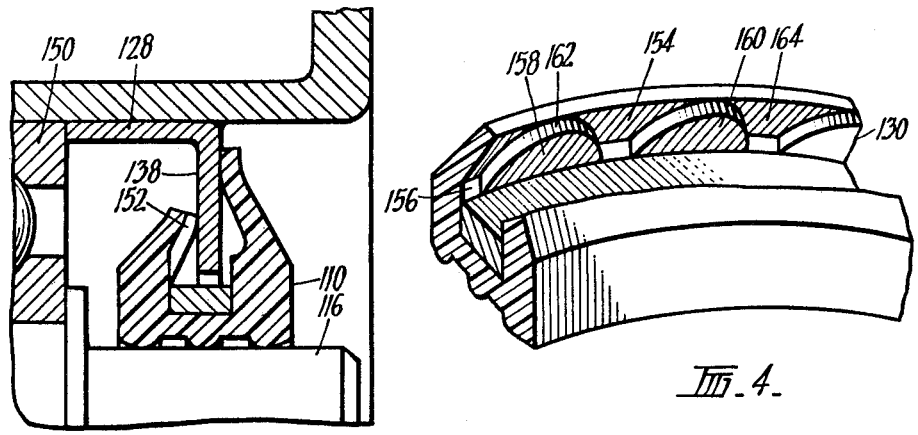
FIG. 4 is a perspective view of the seal of FIG. 3.

An alternative embodiment of the invention is shown in FIGS. 3 and 4, where like parts are given like reference numerals with the addition of the prefix number 1. This embodiment provides means whereby grease or oil for the bearings 150 can be forcibly injected without rupturing the seal 110.

To effect this function the means comprises a plurality of raisures 152 on the inside face 154 of the inner sealing web 130, adapted to locate on the corresponding face 138 of the rotating shell 128. Those raisures 152 take the form of segments of a circle.

A small distance 156 is provided between the edges of the chord of one segment 158 and the edge of the chord of the adjacent segment 160. The raisures 152 are equally spaced about the inside face 154 of the inner sealing web 130 and are of constant thickness throughout.

The chords of the segments are aligned along the base of the seal 110, and the outer curved edge portions 162 thereof finish at or adjacent the sharp inner edge 136 of the inner sealing web 130.

Such an arrangement provides a plurality of substantially triangular shaped passageways 164 from the outer surface of the inner sealing web 130, along the inner surface thereof, to the inner surface of the outer sealing web 118 when in operation.

In operation grease or oil can be injected into the bearings 150 of the conveyor or roller to a predetermined pressure or until it just begins to purge from the outer sealing web 118. This arrangement of raisures 152 on the inner sealing web 130 enables the seal 110 to be equally effective for sealing shafts 116 with both clockwise and anti-clockwise directions of relative rotation. During rotation the grease or oil clinging to the shell 128 wipes across the curved surfaces 162 and is held from escaping through the seal, or is forced back into the bearings 150.

In order that this seal may be manufactured the mold insert used for molding the shape between the inner and outer webs of the aforementioned seal may be provided with suitably shaped cut-outs. These cut-outs may be formed by end spotting onto the sealing face of the inner sealing web with an end spotting tool of appropriate diameter to the required depth.

In a further alternative embodiment of the invention there may be provided an annular recess in the base of the seal between the two webs. This recess may be fractionally wider than the thickness of the shell so that the shell can position therein and hold the seal in the correct operating axial position on the shaft.

These seals may be manufactured from any suitable material such as, for example, a special compound of nitrile synthetic rubber. This material is noted for its oil resistance and has good abrasion resistance. It can be used to seal a wide range of fluids, including dilute acids, alkalis, coolant and anti-freeze fluids, greases and lubricating oils. It is generally satisfactory between the temperature ranges of $-40°$ to $250°$ F, or $-40°$ to $121°$ C.

EP Oils have additives wich start to become active at temperatures above $200°$ F. These additives attack nitrile rubber and cause it to harden and crack. In application where EP oils are used, nitrile rubber will give the best result provided these temperatures are not reached, and invariably it is best to try a nitrile seal first. If it is found that this hardens and cracks then the use of either polyacrylic rubber, or fluorocarbon elastomer such as viton, which is a material having extremely high chemical and temperature resistance, should prove satisfactory.

Whilst there has been described in the foregoing description two preferred constructions of seals incorporating the features of the present invention, it will be understood by those skilled in the art that many modifications or variations in details of design or construction may be made without departing from the essential nature of the invention as ascertained from the following claims.

I claim:

1. A fluid seal for installation as a unit between first and second, relatively rotatable machine elements, said seal unit including a relatively rigid, annular seal case element having a mounting portion for engaging one of said machine elements and a radially extending flange portion having an axially directed first sealing surface facing toward the region to be sealed and an axially directed second sealing surface facing axially away from the region to be sealed, and an annular elastomeric seal element molded into a single piece, said elastomeric element having a seal body including a radially inwardly directed portion adapted to engage the other of said machine elements to form a secondary seal therewith, and first and second, axially inner and outer sealing lip portions extending radially outwardly from the axial ends of said body, said lip portions being spaced apart from each other at the radially inner ends thereof by a radially outwardly facing, circumferentially extending seal body surface, said lips each including a sealing edge adjacent the radially outer portions thereof and having said radially outer portions thereof extending axially towards each other in use, with said sealing edges of said axially inner and outer lips lying in use respectively axially inwardly and outwardly of the central plane of said radial flange of said case element, said edges being also spaced radially apart from each other, said sealing edges being disposed, as said elastomeric element is formed, in axially overlapping relation such that said radially outer edge of said axially inner lip lies axially outwardly of said central plane of said radial flange and said radially outer edge of said axially outer lip lies axially inwardly of said central plane of said radial flange, said case element being positioned in use such that said radial flange thereof extends between said lips, such that said lip edges engage said first and second flange surfaces, respectively, in snug engagement, said lips being thereby biased towards each other and toward said first and second flange surfaces by the inherent resiliency of said lips, thereby furnishing an axially directed sealing force for application to said first and second sealing surfaces respectively.

2. A fluid seal unit as defined in claim 1 in which an annular seal body stiffening element is provided, said stiffening element being disposed in use within said seal body, said stiffener engaging said outwardly facing, circumferentially extending seal body surface and urging said seal body into snug secondary sealing relation with said other of said machine elements.

3. A fluid seal as defined in claim 1 which one of said sealing lip portions includes a shoulder element adjacent the radially inner end of one of said lips thereof, said shoulder serving to reduce the axial extent of said outwardly directed seal body surface, said shoulder further including an axially directed, radially extending portion adapted to engage an inner margin of one of said sealing surfaces on said radial flange of said seal case element when said elastomeric seal body is being urged over said other machine element into a position of use.

4. A fluid seal as defined in claim 1 in which one of said sealing edges on said lip portion is a discontinuous edge, said edge being defined by a plurality of formations disposed on an inner surface of one of said lips, a portion of each of said formations being adapted to engage one of said sealing surfaces on said radial flange in the use of said seal.

5. A fluid seal as defined in claim 1 in which said mounting portion of said seal case is in the form of an axially extending flange having an edge adapted to engage a portion of said element for registering said seal in a desired position of use within said machine element.

6. A fluid seal as defined in claim 1 in which said radially inwardly directed portion of said elastomeric element includes a plurality of annular, circumferentially and radially inwardly extending ribs, said ribs being adapted to engage said other of said machine elements when said seal is installed.

7. A fluid seal as defined in claim 1 in which said auxially inner and outer lip portions each tapers to a reduced thickness at the radially outer portions thereof.

* * * * *